(12) United States Patent
Ono et al.

(10) Patent No.: US 6,798,480 B2
(45) Date of Patent: Sep. 28, 2004

(54) LIQUID CRYSTAL DISPLAY

(75) Inventors: Kikuo Ono, Mobara (JP); Junichi Hirakata, Chiba (JP); Takahiro Ochiai, Mobara (JP); Ryuutaro Oke, Mobara (JP)

(73) Assignee: Hitachi, Ltd., Tokyo (JP)

( * ) Notice: Subject to any disclaimer, the term of this patent is extended or adjusted under 35 U.S.C. 154(b) by 87 days.

(21) Appl. No.: 09/988,676

(22) Filed: Nov. 20, 2001

(65) Prior Publication Data

US 2002/0047970 A1 Apr. 25, 2002

(30) Foreign Application Priority Data

Nov. 22, 2000 (JP) ........................................ 2000-355982

(51) Int. Cl.[7] .............................................. G02F 1/1335
(52) U.S. Cl. ........................ 349/115; 349/113; 349/114
(58) Field of Search .............................. 349/114, 113, 349/122, 115, 98, 46, 43

(56) References Cited

U.S. PATENT DOCUMENTS 5,905,548 A * 5/1999 Shimada ...................... 349/38

2001/0010571 A1 * 8/2001 Kanou et al. ............... 349/113
2002/0126243 A1 * 9/2002 Hibino et al. ............... 349/122

* cited by examiner

Primary Examiner—Jack Chen
Assistant Examiner—Tranhha Pham

(57) ABSTRACT

To improve optical transmission efficiency without reducing optical reflection efficiency. While rays of light coming from a backlight are irradiated from the side of one substrate of respective substrates disposed to oppose each other with a layer of liquid crystal material interposed therebetween, a certain region on a liquid crystal side surface of the one substrate which is surrounded by neighboring gate signal lines being disposed adjacent to each other and drain signal lines being disposed adjacent to each other is adapted for use as a pixel region, in which a pixel electrode is formed for receiving an image signal as supplied from one drain signal line via a thin-film transistor rendered operative by supplement of a scan signal from one gate signal line, wherein this pixel electrode is generally made up from a conductive reflection film and a transparent conductive film that are electrically connected together with a light reclamation or "reuse" film being formed beneath the conductive reflection film through the conductive reflection film and a dielectric film, this light reuse film being electrically insulated from either the gate signal lines or the drain signal lines.

12 Claims, 8 Drawing Sheets

LIQUID CRYSTAL DISPLAY

BACKGROUND OF THE INVENTION

1. Field of the Invention

The present invention relates in general to liquid crystal display devices and, in more particular, to liquid crystal display devices of the so-called partial transmission type active matrix scheme for performing display operations of the transmission type and reflection type.

2. Description of the Related Art

Active-matrix liquid crystal display devices are typically arranged so that gate signal lines extending in an "x" direction and being parallel-provided in a "y" direction and drain signal lines extending in the y direction and parallel-provided in the x direction are formed on a liquid crystal side surface of one substrate of substrates that are disposed to oppose each other with a layer of liquid crystal material interposed between them, wherein a region being surrounded by these signals is adapted for use as a picture element or "pixel" region.

And, formed in this pixel region are a thin-film transistor which is rendered operative by supplement of a scanning signal from a gate signal line disposed along one side of it and a pixel electrode that is expected to receive an image signal supplied thereto from a drain signal line as disposed on one side through this thin-film transistor.

This pixel electrode is designed to permit creation of an electric field between it and an opposite or "counter" electrode that is formed on a liquid crystal side surface of the other substrate disposed with the liquid crystal layer interposed therebetween, thereby to control the liquid crystal's optical transmittance or transmissivity.

And, with such an arrangement, liquid crystal display devices of the so-called partial transmission type for performing display of the transmission type and reflection type include a prior known device which is designed so that the pixel electrode is made up from a conductive reflection film and transparent conductive film that are electrically connected together.

More specifically, in the case of using as the transmission type while letting a back-light unit repeat turn-on and -off operations to exhibit blinking, an observer is able to observe the light from such backlight through the transparent conductive film and the layer of optical transmissivity-controlled liquid crystals; alternatively, in the case of using as the reflection type while letting the backlight turn off, he or she can observe external light as reflected off by the conductive reflection film via the optical transmissivity-controlled liquid crystals.

The crystal display device arranged in the way stated above has the following objects to be solved regarding the efficiency of light ray utilization say, light utilization efficiency. To be brief, it has been pointed out that although a specific transparent conductive film with its optical transmissivity of more than 90 percent (%) such as ITO is used for a light pass-through portion while employing a thick Al at a reflective portion for establishment of the surface reflectivity of approximately 80%, part of the pixel region is used as a transmission section whereas the remaining part is for use as a reflection section so that the performance of each is in the "half-done" state.

Note here that Japanese Patent Laid-Open No. 281972/1999 discloses therein a technique for causing light rays from the backlight to pass through a high polymer molecule resin film (used as a protective film) with convexo-concave surface irregularities on the liquid crystal side surface of a transparent substrate as disposed to oppose it while letting reflected light as formed on its upper surface reflect again at the backlight to thereby utilize this as transmitted light.

However, according to experimentation by the inventors as named herein, it has been affirmed that this technique is not sufficient in actual re-reflection efficiency because of the fact that the polymer film's light absorption coefficient is greater resulting in the light penetrating this film a couple of times.

In addition, as in a pixel structure indicated in the above-identified Japanese patent No. 281972/1999, in the case of employing an ITO as its transparent electrode and then fabricating a polymer resin film with irregular surface configuration and a reflection electrode made of Al at later process steps, it will become difficult to arrange the reflection electrode by use of a single-layer of Al.

This can be said because a developing solution at photoresist process steps for pattern formation behaves to penetrate into an underlying layer(s) to finally touch the ITO, resulting in unwanted occurrence of electrolytic corrosion due to the presence of a work function difference between the ITO and Al.

Due to this, as shown for example in Japanese Patent Laid-Open No. 231993/1999, certain one is known which is arranged so that the reflection electrode is of a multilayer structure with its underlying layer formed of a high-melting-point metal layer such as Mo or the like and also with its overlying layer made of Al.

However, in the case of fabrication of the reflection electrode in this way, there is a penalty which follows: the resultant efficiency for utilizing the light from the backlight as the required transmission light while forcing it to experience reflection again is hardly sufficient because of the fact that Mo is lower in reflectivity than Al.

Alternatively, with regard to ones of the active matrix type comprising a thin-film transistor at each pixel as manufacturable through several processes requiring increased precision, these ones suffer from deficiency in production yields; in particular, they are strictly required to absolutely avoid risks of electrical shortcircuiting between neighboring gate signal lines or adjacent drain signal lines.

SUMMARY OF THE INVENTION

The present invention has been made in view of the above technical background, and its primary object is to provide a liquid crystal display device capable of improving the optical transmissivity without reducing the optical reflectivity thereof.

It is another object of this invention to provide a liquid crystal display device capable of avoiding electrical short-circuiting between neighboring signal lines.

A brief summary of a representative one of those inventive principles of the invention as disclosed herein will be set forth below.

In summary, the liquid crystal display device in accordance with the instant invention is featured in that light from a back-light unit is irradiated from the side of one substrate of respective substrates disposed to oppose each other with a layer of liquid crystal material being interposed therebetween, that a region on a liquid crystal side surface of the one substrate as surrounded by neighboring gate signal lines and neighboring drain signal lines is adapted for use as a pixel region, that a pixel electrode is formed within this pixel region, to which electrode an image signal from one drain signal line is supplied via a thin-film transistor as rendered operative by supplement of a scan signal from one gate signal line, that this pixel electrode is constituted from a conductive reflection film and a transparent conductive film being electrically connected together, that a light reuse film is formed beneath the conductive reflection film through the conductive reflection film and a dielectric film, and that this light reuse film is electrically isolated from either the gate signal lines or the drain signal lines.

The liquid crystal display device thus arranged is such that fabrication of the light reuse film in particular permits light from the backlight to reflect onto this light reuse film and further reflect at the surface of the backlight to thereby enable it to pass through the transparent conductive film which is part of the pixel electrode.

Additionally, since this light reuse film is laid out beneath the conductive reflection film with a dielectric film interposed therebetween, there are no inconveniences as to spaces at any remaining members, which will become the one that utilizes so-called dead spaces; thus it is possible to enlarge the area thereof, which in turn makes it possible to achieve efficient utilization of light rays concerned.

In addition, as this light reuse film is formed to have its unique effects unlike the one that requires other members to also have light reutilization capabilities, it becomes possible to offer its unique choiceability of material or else due to the reason for improvement in reflection efficiency or the like.

Furthermore, as this light reuse film is electrically isolated from signal lines, any capacitive coupling will no longer take place between the film and any pixel electrode overlapping it through a dielectric film; thus it is possible to avoid the problem as to unwanted potential variation or deviation at such pixel electrode.

Moreover, as this light reuse film is electrically isolated from signal lines, it is also possible to avoid the risk of electrical shortcircuiting between neighboring ones of the signal lines which are adjacent each other with this light reuse film laid between them.

DESCRIPTION OF THE PREFERRED EMBODIMENTS

Preferred embodiments of the liquid crystal display device incorporating the principles of the present invention will now be set forth with reference to the accompanying drawings below.

Figure 1:
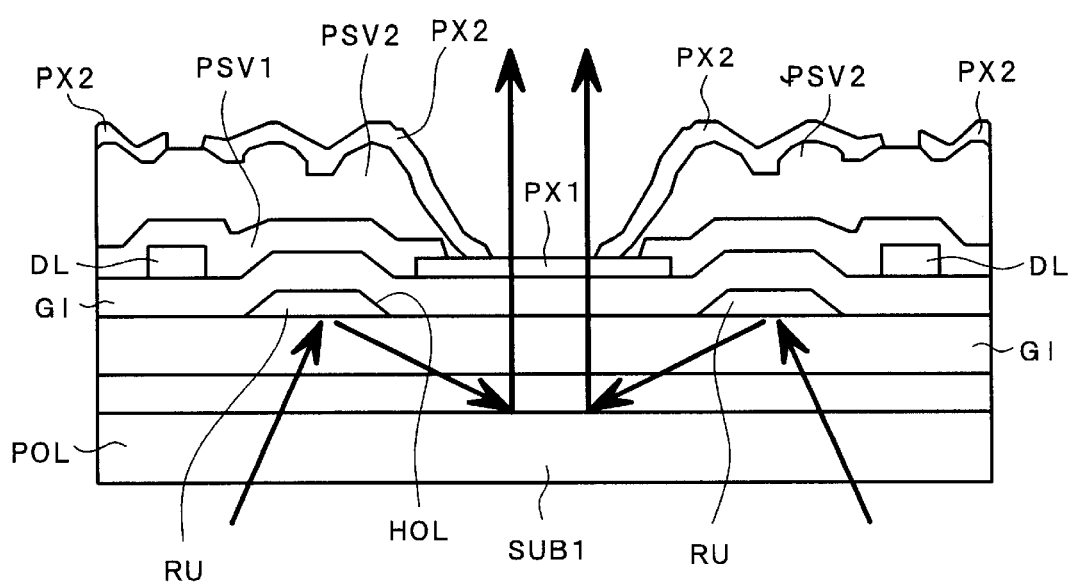
FIG. 1 is a diagram showing an arrangement of one embodiment of a pixel of a liquid crystal display device in accordance with the present invention, which is a cross-sectional view as taken along line I—I of FIG. 2.
Figure 2:
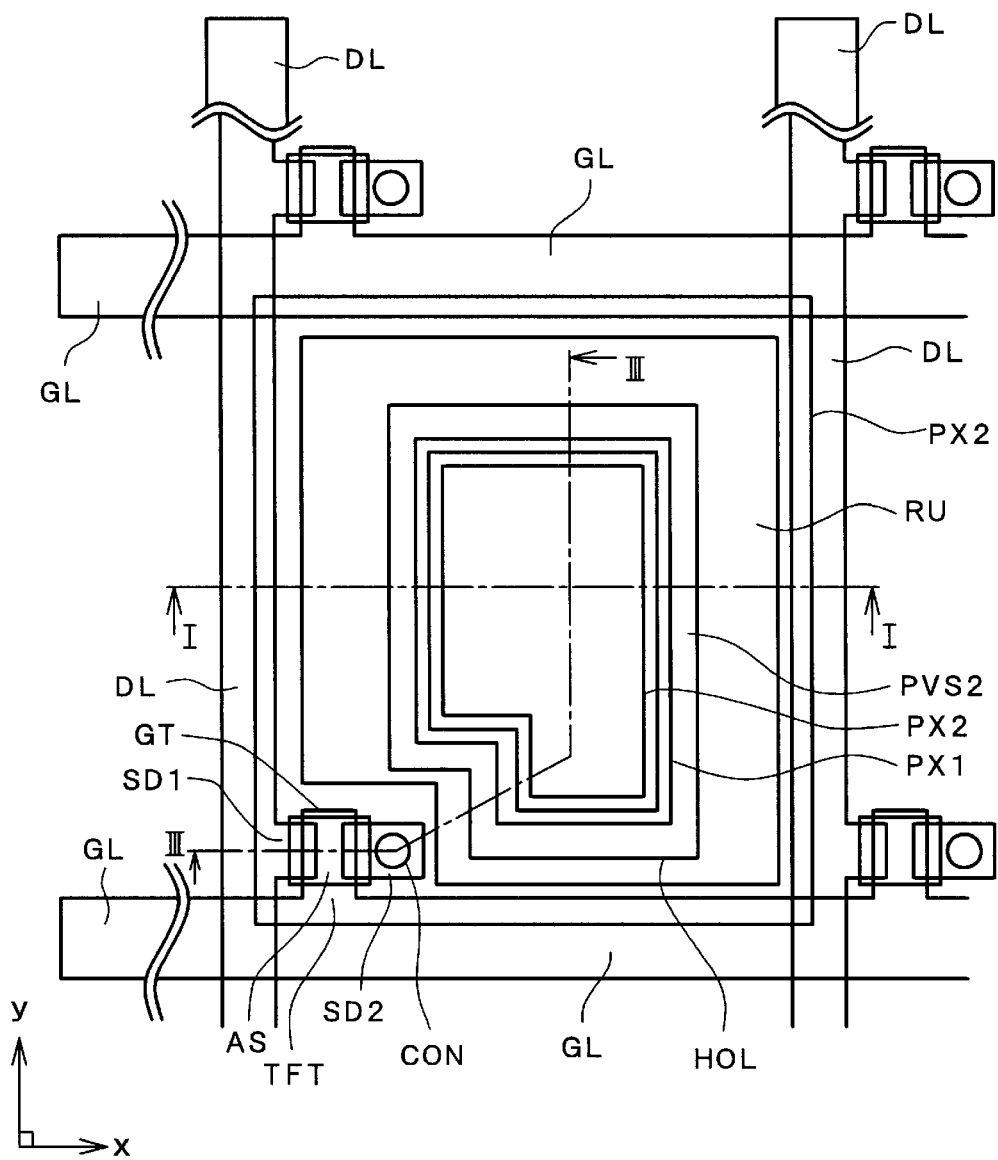
FIG. 2 is a diagram showing a plan view of one embodiment of the pixel of liquid crystal display device in accordance with the present invention.
Figure 3:
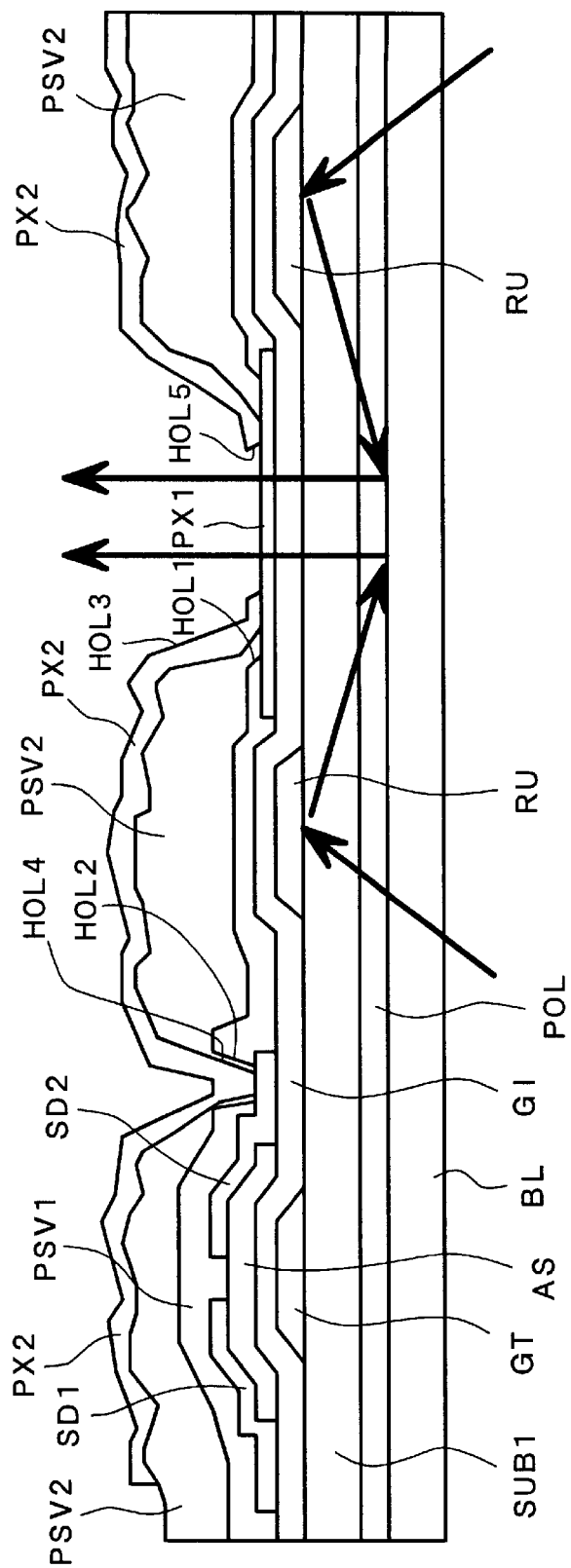
FIG. 3 is a diagram showing a sectional view taken along line III—III of FIG. 2.

Embodiment 1:

FIG. 2 is a diagram showing a plan view of a pixel of a liquid crystal display device in accordance with one embodiment of the instant invention. In addition, FIG. 1 shows a cross-sectional view of the pixel as taken along line I—I of FIG. 2; and, FIG. 3 depicts a sectional view of it taken along line III—III of FIG. 2.

Note here that FIG. 2 is the one that shows a plan view of a single pixel of respective pixels as laid out into a matrix form, wherein other pixels located on the right and left sides of this pixel or alternatively on the upper and lower positions thereof are similar in arrangement to the pixel shown herein.

In FIG. 2, firstly, gate signal lines GL are formed on a surface of a transparent substrate SUB1 in such a manner that these extend in an "x" direction in the drawing and are parallel-provided in a "y" direction.

As will be described later in the description, these gate signal lines GL are such that a region surrounded by them and also by drain signal lines DL which are formed to extend in the y direction in the drawing and are parallel-provided in the x direction is defined as a pixel region.

Respective gate signal lines GL surrounding the pixel region include one (on lower side in the drawing) gate signal line GL which is arranged so that an extension portion that extends by little into the pixel region at a location adjacent to one (on the right in the drawing) drain signal line DL of respective drain signal lines DL surrounding the pixel region, wherein this extension makes up a gate electrode GT of a thin-film transistor TFT.

Additionally formed within the pixel region is a light reclamation or "reuse" film RU, which is fabricated at the same time that the gate signal lines GL are fabricated, by way of example.

This light reuse film RU is physically separated from the gate signal lines GL and is formed to bypass the fabrication region of the thin-film transistor TFT without overlapping any drain signal lines DL as will be later described.

And, this light reuse film RU is such that an opening or hole HOL is formed substantially at its central portion for enabling light (light coming from a back-light unit to be later described) to pass through this hole HOL.

More specifically, the hole HOL as formed in this light reuse film RU is formed as a light penetration portion of the pixel region with an arrangement that the light reuse film RU is fabricated to surround the periphery of this light penetration portion.

As shown in FIG. 1 or FIG. 3, the backlight BL is disposed on the transparent substrate SUB1 side for causing the light from this backlight BL to have certain rays which are expected to progress straightforwardly through the hole HOL as formed in the light reuse film RU and other rays that behave to reflect at the back surface of the light reuse film RU and further reflect at the top surface of backlight BL and thereafter travel through the hole as formed in the light reuse film RU.

And a dielectric film GI which is formed for example of an SiN film is fabricated on the surface of the transparent substrate SUB1 in such a manner as to cover or coat the gate signal lines GL and light reuse film RU thus formed in this way (see FIG. 1 and FIG. 3).

This dielectric film GI has a function as an interlayer dielectric film with respect to the gate signal lines GL of drain signal lines DL to be later described and, in the formation region of a thin-film transistor TFT to be later described, has a function as a gate insulation film thereof.

An island-like semiconductor layer AS that is made for example of amorphous silicon (a-Si) is formed in a region overlying the gate electrode GT on the surface of the dielectric film GI in such way as to override the gate electrode GT.

While this semiconductor layer AS has its upper surface on which a pair of electrodes (drain electrode SD1 and source electrode SD2) are to be formed with the gate electrode GT being midway between these electrodes to thereby form a metal-insulator-semiconductor (MIS) type thin-film transistor TFT of the so-called reverse stagger structure, these respective electrodes SD1, SD2 are arranged so that these are fabricated simultaneously during formation of the drain signal lines DL.

More specifically, on or over the dielectric film GI, more than one drain signal line DL which extends in the y direction in the drawing and is formed in the x direction is fabricated in such a manner that part of this drain signal line DL is extended to reach part of the surface of the semiconductor layer AS, thus forming the drain electrode SD1.

In addition, at such process step, the source electrode SD2 is formed. This source electrode SD2 is such that its extension portion extending slightly up to the pixel region side is also formed simultaneously. This extension is designed to constitute a contact section CON for establishing connection with a pixel electrode PX as will be described later.

It should be noted that in this embodiment, the drain signal line DL is formed to have a multilayer structure which consists essentially of an underlying layer made for example of high-melting-point metal such as Mo or the like (others are Ti, Ta, Cr, W) and its overlying layer made of Al or else for example. The use of such multilayer structure is aimed at improvement in contact with the semiconductor layer AS at the drain electrode SD1 and source electrode SD2.

Further, a transparent conductive film PX1 that is comprised for example of an indium-tin-oxide (ITO) film is formed at part of the hole HOL of the light reuse film RU on the upper surface of the dielectric film GI within the pixel region, wherein the film PX1 has a concentric pattern relative to this hole HOL.

This transparent conductive film PX1 is arranged as part of the pixel electrode PX and is designed to make up the pixel electrode PX per pixel together with a conductive reflection film PX2 as will be set forth later in the description.

On the surface of the dielectric film GI with the drain signal lines DL (drain electrode SD1, source electrode SD2) and the transparent conductive film PX1 formed thereon in the way discussed above, a protective film PSV1 comprised for example of SiN film (with a thickness of 300 nm for example) is fabricated to also cover these drain signal lines DL and others, wherein there are defined in this protective film PSV1 a hole HOL1 for permitting exposure of a central portion excluding peripheral portions of the protective film PSV1 and a hole HOL2 for exposure of part of the contact section CON of the source electrode SD2.

Additionally formed on the surface of the protective film PSV1 is a protective film PSV2 comprised for example of a high polymer molecule resin film (with a thickness of 1500 nm or greater by way of example), wherein there are defined in this protective film PSV2 a hole HOL3 for causing exposure of a central portion excluding the peripheral portions of the protective film PSV1 and a hole HOL4 for exposure of part of the contact section of the source electrode SD2.

Any one of the protective films PSV1 and PSV2 is principally aimed at avoidance of any direct contact of the thin-film transistor TFT due to liquid crystals LC to thereby preclude degradation in characteristics of such thin-film transistor TFT.

Here, letting the protective film PSV2 be formed of an organic film such as the polymer resin film or else is aimed at, for example, reduction of the dielectricity of the protective film as a whole.

Additionally this protective film PSV2 is formed so that convex and concave portions are arrayed regularly or in an intersperse fashion on the surface thereof.

And, formed on an upper surface of this protective film PSV2 is a conductive reflection film PX2 which consists essentially of sequential laminated or "multilayered" films of Mo (or alternatively Ti, Ta, Cr, W) and Al by way of example.

In this case, due to the presence of the above-noted convexo-concave surface configuration of the protective film PSV2 for use as its undercoat layer, the conductive reflection film PX2 also is formed to have a corresponding pattern of convexo-concave configuration on the surface thereof. This reflection film PX2 is a reflection film for permitting reflection of any externally attendant light rays coming from the observer side of the liquid crystal display device, which film is designed to have an ability to sufficiently disperse or scatter such reflection.

This conductive reflection film PX2 is formed in such a manner that its outer contour portion slightly overlaps certain ones of the gate signal lines GL and drain signal lines DL with a hole HOL5 being defined at part corresponding to the formation region of the transparent conductive film PX1, wherein the hole HOL5's circumferential portion is formed to directly overlap the outer periphery of the transparent conductive film PX1 to thereby establish electrical connection between these conductive reflection film PX2 and transparent conductive film PX1.

In this case, since the underlying layer of the conductive reflection film PX2 comprised of the multilayer structure is made of Mo, it is possible to let the connection with the transparent conductive film PX1 to be formed for example of an ITO film have reliability.

It has been stated above that the conductive reflection film PX2 and transparent conductive film PX1 make up the pixel electrode PX, which is connected to the contact section CON of the source electrode SD2 of thin-film transistor TFT through the holes HOL4, HOL2 as defined in the films PSV2 and PSV1 respectively.

Additionally this pixel electrode PX permits creation of an electric field(s) between itself and an opposite or "counter" electrode (transparent electrode) which is commonly formed within respective pixel regions on the liquid crystal side surface of another transparent substrate SUB2 (not depicted) as disposed to oppose the pixel electrode-formed transparent substrate SUB1 with a layer of liquid crystal material interposed therebetween, thereby providing the intended controllability of the optical transmissivity of liquid crystals LC.

On a specific surface of the transparent substrate SUB1 thus arranged which is on the opposite side to the liquid crystal side, a polarization plate POL is adhered with the backlight BL disposed.

The liquid crystal display device with the arrangement stated above is such that while in the case of being used as the so-called transmission type one with the backlight unit BL being driven to recurrently turn on and off or "blink" the light incoming from this backlight BM is expected to travel straightforward to pass through the formation region of the transparent conductive film PX1 this is the region surrounded by the conductive reflection film PX2 and then offer irradiation to the observer side through the liquid crystals LC with controlled optical transmissivities, it is reflected at the back surface of the light reuse film RU and further is reflected off at the top surface of backlight BL as shown in FIG. 1, which in turn makes it possible to increase the amount of light passing through the formation region of the transparent conductive film PX1.

In this case, although reflected rays of the light from the backlight BL which have been reflected at the back face of the conductive reflection film PX2 also are expected to penetrate the formation region of the transparent conductive film PX1, the resultant light reclamation efficiency owing to the light reuse film RU becomes extremely noticeable because of the fact that this reflected light is great in degree of optical absorption due to the presence of the protective films PSV1, PSV2 (in particular, the protective film PSV2 formed of a chosen polymer resin film is high in optical absorbability).

It is also noted that since the conductive reflection film PX2 is such that its under layer is made of Mo less in optical reflectivity as stated previously, it will no longer practical to improve the light reuse efficiency by reflection due to this conductive reflection film PX2.

Further note that in the above stated embodiment, the light reuse film RU is formed at the same layer as the gate signal lines GL while at the same time being formed so that it is physically separated from such gate signal lines GL. This offers an effect which follows: even in the event that electrical shorting occurs due to certain causes between the light reuse film RU and one gate signal line GL of the pair of gate signal lines GL as located with this light reuse film RU interposed between them, it becomes possible to avoid any unwanted electrical shorting with the remaining gate signal line GL.

Figure 4:
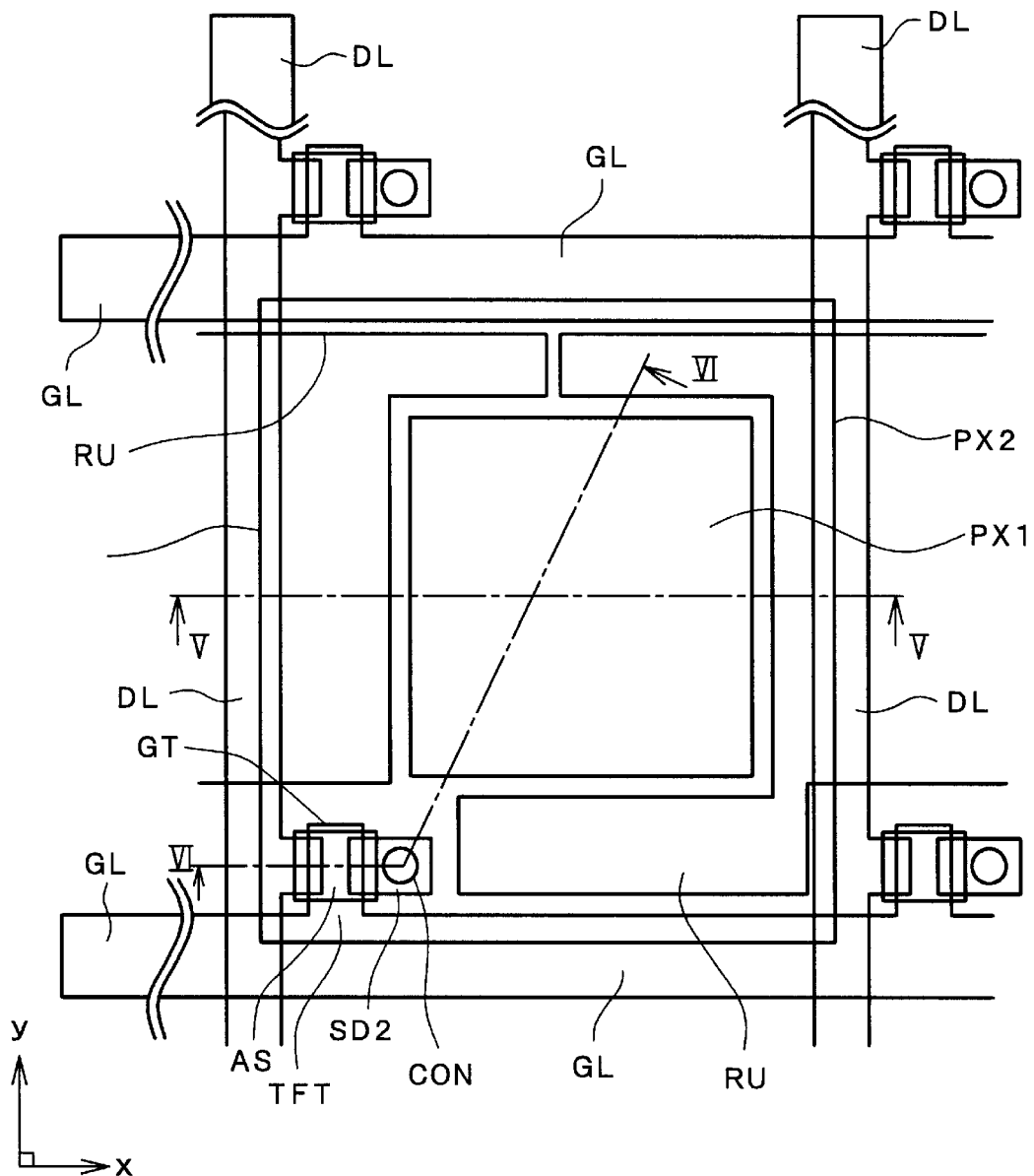
FIG. 4 is a diagram showing a plan view of another embodiment of the pixel of a liquid crystal display device in accordance with the present invention.
Figure 5:
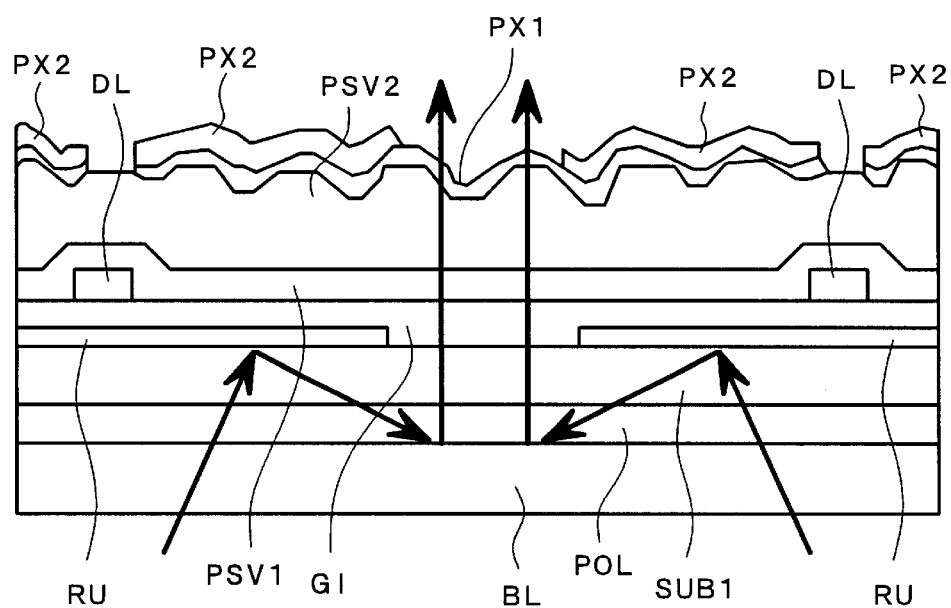
FIG. 5 is a diagram showing a sectional view taken along line V—V of FIG. 4.
Figure 6:
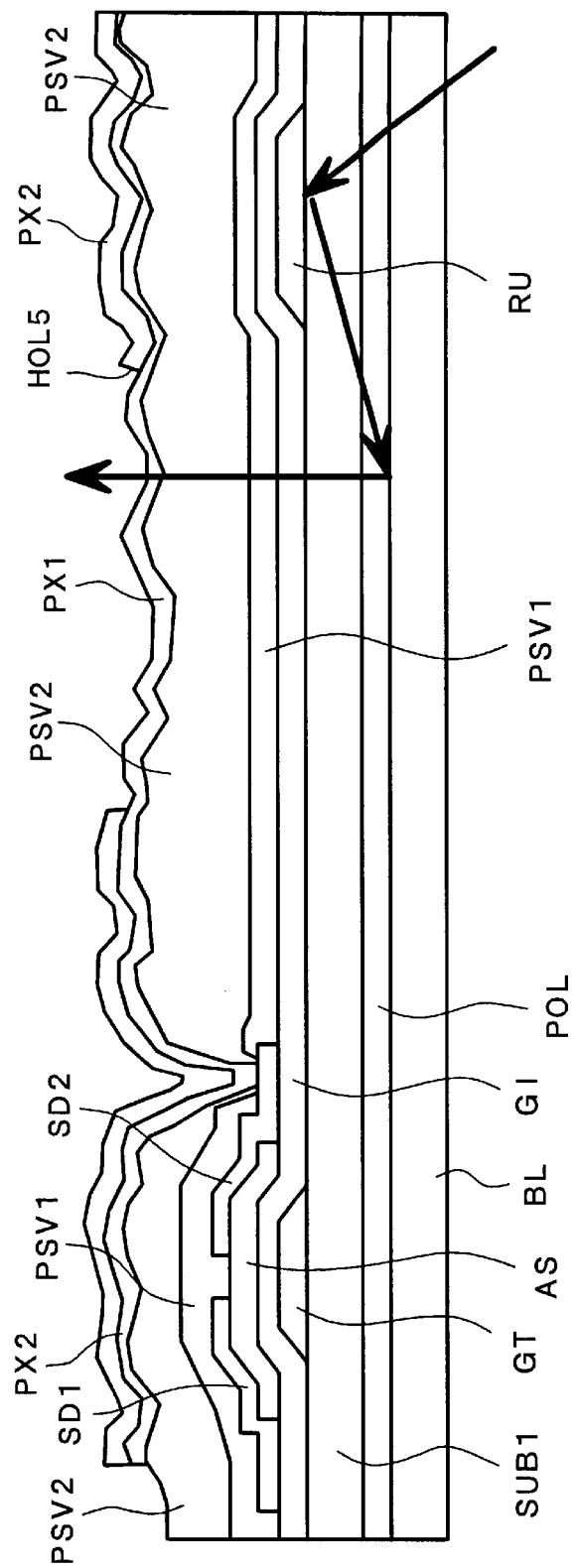
FIG. 6 is a diagram showing a sectional view taken along line VI—VI of FIG. 4.

Embodiment 2:

FIG. 4 is a diagram showing a plan view of a pixel of a liquid crystal display device in accordance with another embodiment of the present invention, which is a diagram corresponding to FIG. 2. In addition, FIG. 5 shows a cross-sectional view of the pixel as taken along line V—V of FIG. 4 whereas FIG. 6 depicts a sectional view of it taken along line VI—VI of FIG. 4.

A difference from the arrangement shown in FIG. 2 lies in a light reuse film RU which is formed integrally with the light reuse film RU of a neighboring pixel region in the x direction in the drawing, that is, in the running direction of gate signal lines GL.

More specifically the light reuse film RU is so formed as to reach part of the underlying layer of a drain signal line DL.

As previously stated, the drain signal line DL is made of the same material as those of the drain electrode SD1 and source electrode SD2 of a thin-film transistor TFT, wherein it is constituted from a sequential lamination or "multilayer" body of high-melting-point metal (Mo, Ti, Ta, Cr) and Al for purposes of improvement in reliability of connection with the semiconductor layer AS stated supra.

This will become deficient due to the fact that the high-melting-point metal is relatively less in optical reflectivity in the case of letting it have the function as the light reuse film RU for introduction of the light from the backlight BL toward the transparent conductive film PX1 at the back surface of drain signal line DL.

Due to this, the light reuse film RU is specifically designed to extend up to the underlying layer portion of drain signal line DL for connection with another light reuse film RU of a neighboring pixel region.

And the light reuse film RU with the above-noted arrangement is subdivided into two portions within the pixel region in a direction along the drain signal line DL.

The reason for employment of such arrangement is as follows. It is to avoid any accidental occurrence of electrical shortcircuiting between different drain signal lines DL via the light reuse film RU in cases where shortcircuiting takes place between the drain signal line DL and its underlying light reuse film RU due to the presence of pin-holes as formed in the dielectric film GI with or without association of electrical shorting between another drain signal line DL and its underlying light reuse film RU.

In addition, in the case of this embodiment, both the transparent conductive film PX1 and the conductive reflection film PX2 for constitution of the pixel electrode PX are formed on the upper surface of a protective film PSV2; in the case of this embodiment, the transparent conductive film PX1 is formed over the conductive reflection film PX2.

More specifically the transparent conductive film PX1 is formed to cover almost the entire region of the pixel region, wherein the conductive reflection film PX2 is stacked or laminated on the upper surface of this transparent conductive film PX1 with a hole HOL5 being formed substantially at a central portion of the pixel region.

In the case of the pixel electrode PX arranged in this way, it is possible to continuously perform fabrication of the transparent conductive film PX1 and fabrication of the conductive reflection film, which in turn makes it possible to reduce the requisite number of manufacturing process steps.

Additionally with such an arrangement, the transparent conductive film PX1 and the light reuse film RU are disposed through the dielectric film GI and protective film PSV1 plus protective film PSV2. Due to this, capacitive coupling will hardly occur between the transparent conductive film PX1 and light reuse film RU; thus, it becomes possible to avoid on-screen display defects otherwise occurring due to such capacitive coupling.

Figure 7:
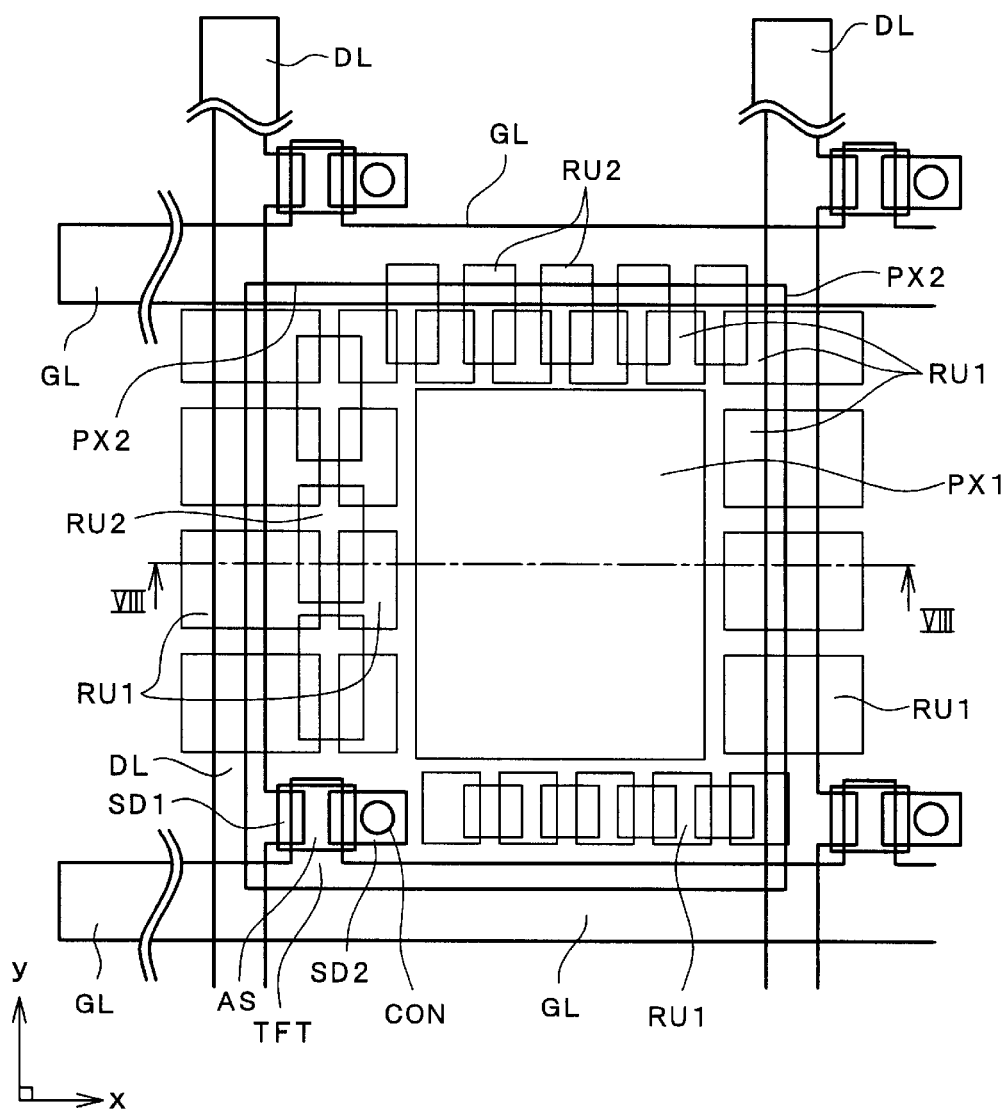
FIG. 7 is a diagram showing a plan view of still another embodiment of the pixel of a liquid crystal display device in accordance with the present invention.
Figure 8:
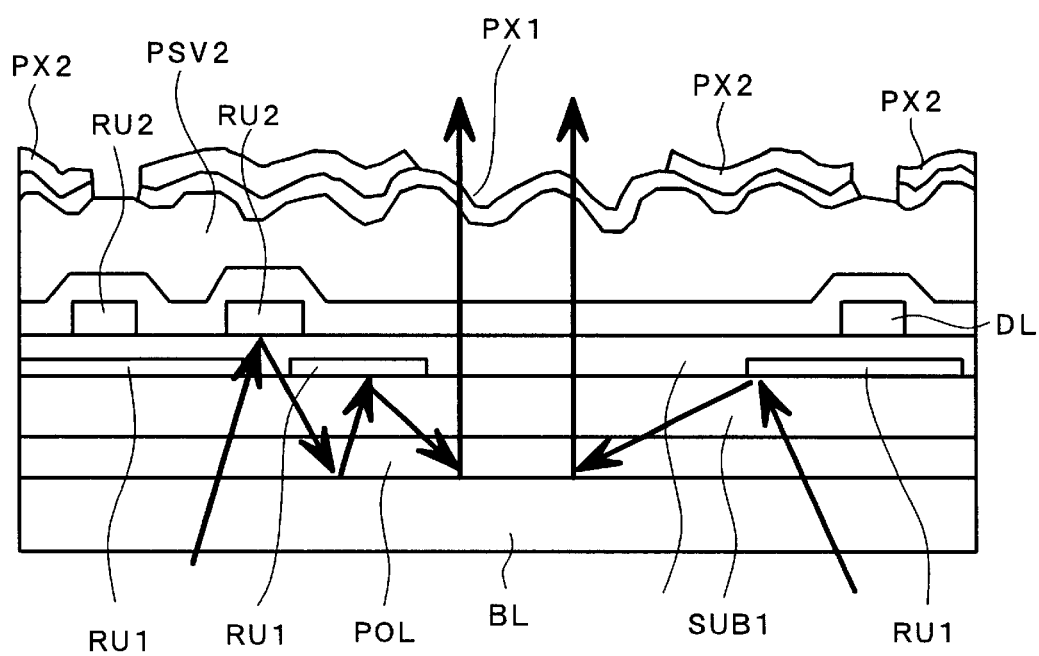
FIG. 8 is a diagram showing a sectional view along line VIII—VIII of FIG. 7.

Embodiment 3:

FIG. 7 is a diagram showing a plan view of a pixel of a liquid crystal display device in accordance with still another embodiment of the present invention, which is a diagram corresponding to FIG. 5. In addition, FIG. 8 shows a sectional view as taken along line VIII—VIII of FIG. 7.

The embodiment of FIG. 7 is shown as a further improved arrangement of the embodiment 2. A principal difference from Embodiment 2 is that the light reuse film RU is physically fragmented into pieces resulting in formation at the same layer (upper surface of dielectric film GI) of a great number of light reuse films RU1 as separated thereby.

The reason for employment of such physical separation of the light reuse film RU1 is as follows. It is to preclude operation errors otherwise occurring due to potential variation or deviation at the pixel electrode PX due to the capacitive coupling between the light reuse film RU1 and pixel electrode PX overlapping each other with a relatively large area in the event that the drain signal line DL is electrically shorted with its underlying light reuse film RU1 by certain causes.

In other words, even upon occurrence of the above-noted obstruction, most portions of the light reuse film RU1 overlapping the pixel electrode PX will be able to retain the floating state thereof.

In addition with this embodiment, the use of such a fragmented arrangement of the light reuse film RU1 results in achievement of an arrangement which is capable of avoiding risks of reduction of light reuse effects as a result of decrease in area of the light reuse film RU1, by forming a metal film simultaneously during fabrication of drain signals [sic: the word "signals" should have read—signal lines—; appropriate correction is required] DL and then forming this metal film as a second light reuse film RU2.

More specifically, an increased number of second light reuse films RU2 are formed in such a manner as to overlap respective separation portions of the light reuse film RU1 to be formed simultaneously during formation of gate signal lines GL in other words, bury or embed those portions between respective light reuse films RU1.

With such an arrangement, it is possible to permit the back surface of second light reuse film RU2 also to have light reuse functionality as shown in FIG. 8; additionally, it becomes possible by letting this second light reuse film RU2 also be designed to have a fragmented structure to avoid the above-stated problems otherwise occurring due to shorting with signal lines concerned.

From the foregoing, it would readily occur to those skilled in the art that the second light reuse film RU2 may alternatively be formed to overlap its associated gate signal line GL in order to improve the light reuse efficiency thereof.

It is apparent from the foregoing explanation that in accordance with the liquid crystal display device incorporating the principles of the present invention, it is possible to obtain the one with improved optical transmissivity without reducing the optical reflection efficiency.

What is claimed is:

1. A liquid crystal display device, wherein:
   light from a back-light unit is irradiated from the side of one substrate of respective substrates as disposed to oppose each other with a layer of liquid crystal material being interposed therebetween;
   a region on a liquid crystal side surface of the one substrate surrounded by neighboring gate signal lines and neighboring drain signal lines is adapted for use as a pixel region;
   a pixel electrode is formed within this pixel region, to which electrode an image signal from one drain signal line is supplied via a thin-film transistor rendered operative by supplement of a scan signal from one gate signal line;
   the pixel electrode is constituted from a conductive reflection film and a transparent conductive film being electrically connected together;
   a light reuse film is formed beneath the conductive reflection film and a dielectric film; and
   the light reuse film is electrically isolated from either the gate signal lines or the drain signal lines and formed to underlie the drain signal line with the dielectric film interposed therebetween, and the light reuse film is formed to overlap the drain signal line.

2. The liquid crystal display device as claimed in claim 1, wherein the light reuse film is comprised of the same layer and the same material as the gate signal lines.

3. The liquid crystal display device as claimed in claim 1, wherein the light reuse film is formed of a single-layer film of Al or Ag or alternatively a sequential multilayer body of Al and high-melting-point metal(s).

4. The liquid crystal display device as claimed in claim 1, wherein the transparent conductive film is substantially centrally disposed in the pixel region and that the conductive reflection film is disposed to surround the transparent conductive film with its inner contour portion being electrically connected to an outer contour portion of the transparent conductive film.

5. The liquid crystal display device as claimed in claim 4, wherein a sequential multilayer body of a protective film made of inorganic material and a protective film made of organic material is formed between the transparent conductive film and the light reuse film.

6. The liquid crystal display device as claimed in claim 1, wherein the light reuse film is formed and connected to a light reuse film in another pixel region adjacent thereto with a drain signal line disposed therebetween.

7. The liquid crystal display device as claimed in claim 6, wherein the light reuse film in the pixel region is subdivided into portions in a direction along the drain signal line.

8. The liquid crystal display device as claimed in claim 1, wherein the pixel electrode is structured from a sequential multilayer body of more than one transparent conductive film and conductive reflection film and that the conductive reflection film has an opening as formed substantially centrally in the pixel region to thereby permit exposure of the transparent conductive film.

9. The liquid crystal display device as claimed in claim 8, wherein a sequential multilayer body comprising the dielectric film and a protective film made of inorganic material plus a protective film made of organic material is formed between the light reuse film and the pixel electrode.

10. The liquid crystal display device as claimed in claim 1, wherein the light reuse film is formed of a first light reuse film being formed at the same layer as the gate signal line and a second light reuse film being formed at the same layer as the drain signal line, and that at least either one of the first light reuse film and the second light reuse film is subdivided into a plurality of portions with a remaining one of the first and second light reuse films being formed to overlap in a divided region thereof.

11. The liquid crystal display device as claimed in claim 10, wherein the second light reuse film is formed to overlap the gate signal line.

12. The liquid crystal display device as claimed in claim 2, wherein the light reuse film is formed of a single-layer film of Al or Ag or alternatively a sequential multilayer body of Al and high-melting-point metal(s).

* * * * *